United States Patent

[11] 3,568,065

[72] Inventors Hubertus Pagany; Hans Rasehorn, Hildesheim, Germany
[21] Appl. No. 744,839
[22] Filed July 15, 1968
[45] Patented Mar. 2, 1971
[73] Assignee Blaupunkt-Werke GmbH Hildesheim, Germany
[32] Priority Aug. 31, 1967
[33] Germany
[31] B94243

[54] SIGNAL SEEKING SCANNING COMMUNICATION RECEIVER WITH LOWER GAIN DURING SCANNING
6 Claims, 1 Drawing Fig.

[52] U.S. Cl. .......... 325/422, 325/470
[51] Int. Cl. .......... H04b 1/32
[50] Field of Search .......... 325/399, 420, 422, 469, 470, (Inquired); 334/(Inquired); 333/17, (Cursory)

[56] References Cited

UNITED STATES PATENTS

| | | | |
|---|---|---|---|
| 3,492,584 | 1/1970 | Takamasmi .......... | 325/469 |
| 2,727,139 | 12/1955 | Hollandbeck .......... | 325/422 |
| 2,764,675 | 9/1956 | Guyton .......... | 325/470 |
| 2,854,569 | 9/1958 | Andrews et al. .......... | 325/470 |
| 2,977,467 | 3/1961 | Black .......... | 325/469 |
| 3,233,179 | 2/1966 | Klettke .......... | 325/422 |
| 3,384,826 | 5/1968 | Schurig .......... | 325/422 |
| 3,447,087 | 5/1969 | Takezaki et al. .......... | 325/422 |

*Primary Examiner*—Robert L. Griffin
*Assistant Examiner*—James A. Brodsky
*Attorney*—Stephen H. Frishauf

ABSTRACT: The threshold for signals to be selected during scanning is set such that signals will be selected which are just above the noise level of the receiver; during scanning, a gain control circuit regulates the overall gain of the receiver below its normal sensitivity, so that only stronger signals will be selected which, however, after having been selected will be amplified with a higher gain than during the scanning for selection.

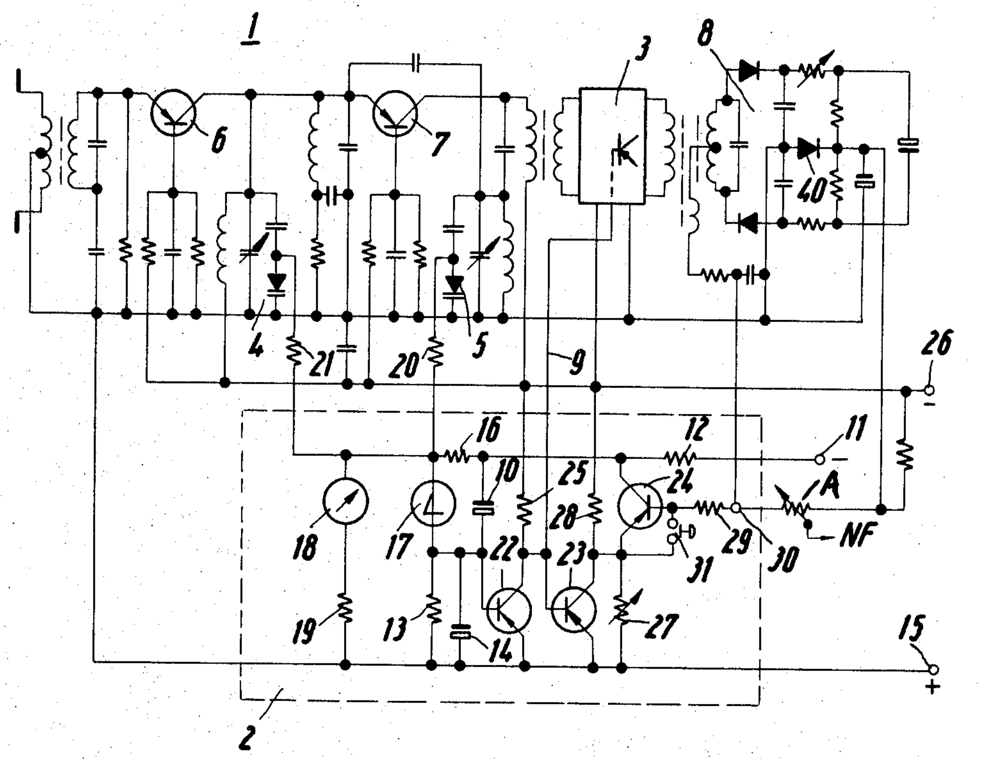
HUBERTUS PAGANY &
HANS RASEHORN,
Inventors
Stephen H. Frishauf
Atty

SIGNAL SEEKING SCANNING COMMUNICATION RECEIVER WITH LOWER GAIN DURING SCANNING

The present invention relates to a superheterodyne receiver which scans over its normal receiving frequency band to seek signals exceeding a certain level, for example the noise level, and more particularly to such receivers for use as automobile radios.

Automatic signal seeking receivers, also known as panoramic receivers, usually utilize an automatic signal seeking device which, automatically, tunes the tank circuits of the receiver to stations worthy of reception. Such a tuning arrangement is particularly useful in automobile receivers, since the driver need not be concerned with station selection and may give his entire attention to traffic. The automatic scanning of the frequency band can be started by a pushbutton, and the receiver will automatically stop at the first signal which merits reception and reproduction.

The tuning arrangement of such scanning-type receivers may be driven mechanically, or by electronic means. The tank circuits may utilize, for capacitive elements, variable capacity diodes, the capacity of the diodes being determined by the bias applied thereto. For constant tuning over a given band, these diodes are supplied with a steadily rising bias voltage. As soon as the scanning circuit receives a transmitter which merits reproduction, the rise in the bias potential is stopped and the tuning potential is held constant. A steadily rising voltage is easily obtained from a sawtooth wave generator, including a condenser and an electronically controlled discharge path. The condenser is supplied with a constant charge current, so that the potential thereacross rises continuously. After the variable capacity diodes, by change of their capacity, have scanned across the tuning band, that is after the condenser has reached its maximum charge, the condenser is discharged over the electronically controlled discharge path, and a new scanning cycle begins.

If the signal from a transmitter meriting reception is received, the charge cycle supplying the condenser is interrupted, and the potential thereacross is held constant. Interruption of the charge cycle, for example upon receipt of a signal arising within the receiver, is controlled by a control signal exceeding a certain, adjustable and predetermined threshold value.

It has been found that signal seeking receivers may lock onto a signal subject to substantial fading, locking on during one of the periods of intense signal strength. As the signal fades, the control potential generated within the receiver also drops. When this control potential drops below the threshold value, the signal seeking arrangement will start to seek another signal, that is to tune the receiver to a different transmitter. This interferes with continuity of reception. It has previously been proposed to hold the signal seeking circuit, even if there is no, or only a low control potential, by utilizing a time constant element therein; however, upon extended and substantial fading of signals received, the time constant element is still not able to hold the automatic signal seeking arrangement to the transmitter previously tuned. Upon further scanning of the frequency band, the receiver may lock onto another transmitter, provided its signal is above the threshold value, just as the other transmitter also begins to fade. This is disturbing to the listener.

It is an object of the prevent invention to provide a signal seeking receiver which will be responsive to signals of improved quality and meriting reception.

SUBJECT MATTER OF THE PRESENT INVENTION

Briefly, in accordance with the present invention, a circuit is provided which supplies a gain control signal to an amplifier in the receiver, to reduce the gain of the receiver while the receiver is scanning across its frequency band. Thus, during scanning (and only during scanning) a larger or stronger signal is required before the receiver will lock on a particular transmitter. As soon as the receiver stops scanning, that is as soon as the bias applied to the variable capacity diodes reaches a constant level, and does not further change, the sensitivity of the receiver reaches its normal level. Preferably, the receiver is so adjusted that a control signal is provided as soon as a received signal just exceeds the noise level of the receiver while operating at reduced gain. The gain attenuating circuit is disabled, when a station has been locked in, so that the received signal may undergo wide swings in strength without renewed operation of the signal seeking function.

In the case of a frequency modulation receiver, the control voltage dependent on signal strength is preferably derived from the FM detector section, and the gain control signal (or rather, the attenuation signal) is applied to the control electrode of an amplifier element, such as a transistor, in the intermediate frequency amplifier of the FM receiver. Since the basic sensitivity of the receiver is attenuated only during tuning, the control voltage obtained after a receiver has been locked in, is increased over that obtained during continuous scanning, so that continuous scanning of the receiver is effectively prevented. By incorporating a forwardly based diode in the FM detector, the circuit can additionally be used for automatic frequency control.

The components used to provide a variable bias to the variable-capacity diodes may, themselves, be utilized to generate the control signal to attenuate the sensitivity of the receiver during scanning, so that no additional components need be required in building a receiver in accordance with the present invention.

The structure, organization, and operation of the invention will now be described more specifically with reference to the accompanying drawing, wherein the single figure illustrates a circuit diagram of a receiver in accordance with the present invention.

The drawing illustrates the RF and IF section of a receiver 1, in partly schematic form, having an electronic signal seeking-scanning circuit 2. Audio, and low frequency amplification stages have been omitted; they may be coupled to a potentiometer A from a line NF. For a complete illustration of such receivers, reference can be had to any handbook on transistor circuitry, for example to the "Transistor Manual" by the General Electric Company, chapter on audio amplifier circuits and radio receiver circuits. The FM discriminator, peculiar to an FM receiver, is illustrated in the drawing. The receiver has an IF stage 3 of conventional form. Two variable capacity diodes 4 and 5 tune the input to the receiver. Variable capacity diode 4 tunes the RF preamplifier stage, having a transistor 6; variable capacity diode 5 tunes the oscillator of a self-oscillator mixer stage having a transistor 7. Ratio detector 8 is the FM detector to demodulate the IF signal amplified in IF amplifier 3.

The automatic scanning circuit 2 includes a controlled sawtooth wave generator, having an electrolytic condenser 10 as a charge holding condenser, a charging circuit, and a controlled discharge circuit. The charging circuit is connected at terminal 11 to a source of negative voltage, obtained from a supply, for example a battery. Resistance 12 connects the source 11 to the negative electrode of electrolytic condenser 10. The positive electrode of electrolytic condenser 10 is connected over a parallel circuit consisting of a resistance 13 and an electrolytic condenser 14 to terminal 15, connected to the positive terminal of the source of potential. The discharge circuit consists of a series connection of a resistance 16, and a four-layer (breakdown) diode 17, connected in parallel to electrolytic condenser 10. An indicator 18, in series with a resistance 19 is connected on the one hand across four-layer diode 17 and on the other to terminal 15. The junction point of four-layer diode 17 and resistance 16, which is also the connection point of indicator 18, is further connected over a resistance 20 to the anode of variable-capacity diode 5 and over a resistance 21 to the anode of variable-capacity diode 4.

Three PNP transistors 22, 23, 24 form the control circuit for the sawtooth wave generator. The base of transistor 22 is connected to the positive electrode of electrolytic condenser 10; the emitter is connected to terminal 15 and the collector over resistance 25 to a terminal 26, to which the negative potential of a second source of operating potential is connected. The positive terminal of the second source of potential is also connected to terminal 15. The collector of transistor 22 is connected to the base of the transistor 23. The emitter of transistor 23 is also connected to terminal 15. The collector of transistor 22, and hence the base of transistor 23, are further connected by a line 9 to intermediate amplifier 3. Line 9, for example, connects to the control electrode of one, or more, of the intermediate frequency amplifier transistors, as schematically indicated in the FIG. The exact connection will be obvious to those skilled in the art. An adjustable resistance 27 is connected in parallel to the collector-emitter path of transistor 23. Together with a resistance 28, resistance 27 forms a voltage divider connected across negative terminal 26 and positive terminal 15. The collector of transistor 23 is connected to the emitter of transistor 24; the collector of transistor 24 is connected to the negative electrode of electrolytic condenser 10, while its base is connected over a resistance 29 to a terminal 30 which, in turn, is connected to the output of the ratio detector 8. The discriminator potential of ratio detector 8 is thus applied to the base of transistor 24. A pushbutton switch 31 is connected between base and emitter of transistor 24.

OPERATION

Condenser 10 is charged immediately upon turning on of the receiver. This causes a steadily rising voltage across condenser 10 which is applied over resistances 20 and 21 to the variable-capacity diode 4, 5, respectively, to cause varying change in the capacity thereof, and thus to tune the receiver over its design-frequency band. The charging current of the condenser further flows over resistance 13 and causes a voltage drop therein, which is applied to the base of transistor 22, which will become conductive. Thus, the collector potential of transistor 22 will be almost that of terminal 15, so that the base of transistor 23, connected to the collector of transistor 22, is practically at the voltage of terminal 15 and transistor 23 will block. The potential available at the collector of transistor 22 serves as a control signal, in a direction to attenuate the sensitivity of the receiver, by being applied over line 9 to the intermediate frequency amplifier. During charging of condenser 10, that is during scanning of the receiver over its frequency band, transistor 24 will likewise be blocked. The control voltage for transistor 24, and thus the sensitivity of the electronic scanning circuit 2 can be adjusted by adjusting the setting of resistance 27.

If a signal from a transmitter meriting reception is received, the increase in charge applied to condenser 10 is interrupted. This is done in the following manner: when the discriminator voltage exceeds a certain predetermined threshold value, upon reception of such a transmitted signal, the discriminator potential available at terminal 30 will be applied to the base of transistor 24 over resistance 29. Transistor 24 will then be controlled to conductive condition. The current drawn by transistor 24 will be so great that the charging of the condenser 10 is interrupted. No more potential will thus be applied to the base of transistor 22 which will switch to blocking condition, causing a rise of voltage at its collector, and transistor 23 will be brought into conductive condition. Once the continuous charge on the condenser 10 has been interrupted, no further change in the capacity of the variable-capacity diodes will occur, and the signal seeking scanning of the receiver is stopped. The base potential of the discriminator in ratio detector 8 is raised by a few hundred millivolts by diode 40, biased to be conductive. This enables holding the control potential for the transistor very small, so that, when the receiver locks to a transmitter, the tuning will be accurate and regulated to the center frequency of the discriminator curve. Thus, the signal seeking-scanning circuit 2 acts in the manner of a sharp automatic frequency control circuit, so that variations in temperature and operating voltages are substantially compensated.

If a different transmitter is desired, pushbutton contact 31 is operated to cause further operation of the scanning circuit 2. Connection of pushbutton switch 31 short circuits the control potential for transistor 24 and the electrolytic condenser 10 will continue to be charged. The potential on electrolytic condenser 10 will then increase until a signal is received from another strong transmitter and the regulating cycle will start as before.

If no transmitter has been found and the end of the tuning frequency band has been reached, that is if the voltage across condenser 10 reaches the breakdown voltage of four-layer diode 17, then diode 17 will break down and the electrolytic condenser 10 will discharge over resistance 16. When the discharge current decreases below the holding current of the four-layer diode 17, four-layer diode 17 will recover and a new charging cycle may start.

The sensitivity of the signal seeking circuit is preferably so adjusted that, if the basic sensitivity of the receiver 1 is not attenuated, signals received by the receiver which only slightly exceed the noise level will cause a discriminator voltage in the ratio detector 8 which exceeds the threshold of the signal seeking circuit 2, causing the signal seeking circuit to stop scanning. Since, however, the basic sensitivity of the receiver is attenuated due to the control signal applied over line 9 from the collector of transistor 22 to the intermediate frequency amplifier 3, the receiver will stop scanning, that is respond to transmitter signals only which have a sufficient level above the noise level of the receiver before a discriminator voltage is generated which exceeds the threshold which stops scanning of the automatic signal seeking-scanning circuit 2. After a signal has been locked onto, the continued scanning is interrupted, blocking transistor 22 and the control signal applied over line 9 which previously attenuated the basic sensitivity of the receiver is no longer applied. Receiver 1 thus will operate with its full amplification. If the input field, that is the signal to which the receiver is tuned, decreases, no further scanning of the scanning circuit will occur even if the signal to the receiver drops below the value which would be necessary before the receiver could lock on during scanning.

The basic sensitivity of receiver 1 can readily be changed by applying the signal over lines 9, that is from the collector of transistor 22, to the control electrode of a transistor in the intermediate frequency amplifier stage. Of course, more than one transistor in the IF amplifier may be controlled; and, as will be apparent to those skilled in the art, the value of the signal applied to the intermediate frequency amplifier can be controlled by inserting, for example, a potentiometer so that the sensitivity of the receiver during scanning, or rather the extent of attenuation over its basic sensitivity, can be varied.

The invention has been described in connection with an FM receivers; various modifications, and adaption of the invention to AM receivers, within the inventive concept, will be readily apparent to those skilled in the art.

We claim:

1. In a scanning signal seeking communication receiver having:

a signal amplifier (6, 7, 3);

a tuned circuit including a variable capacity diode (4, 5) included in said amplifier;

a sawtooth wave generator (10, 13) connected (16, 20, 21) to the variable capacity diode (4, 5) to supply a variable bias thereto, thereby to change the capacity thereof and thus cause said tuned circuit to scan;

control voltage generating means (8) connected to the output of said amplifier to deliver a control voltage representative of signal strength of received signals, as amplified by said amplifier;

means interconnecting said sawtooth wave generator and said control voltage generating means, said interconnecting means including means (22) to generate a control signal when said control voltage exceeds a predetermined threshold level and being connected (23, 27, 24) to said sawtooth wave generator to interrupt change in the bias supplied to said variable capacity diode (4, 5) upon generation of said control signal;

means (9) connected to said control signal generating means (22) and to said amplifier, and delivering a gain control signal to said amplifier during scanning of said tuned circuit to reduce the gain of the amplifier during scanning only, wherein said amplifier has an amplifier section, switchable between levels of gain upon the application of an appropriate gain control signal to an amplifier control electrode;

said means to generate said control signal includes a control transistor (22); and said means delivering a gain control signal includes a connection (9) from the collector of said control transistor (22) to the control electrode of an amplifier element in said amplifier section to supply a gain switching potential thereto.

2. Receiver according to claim 1, wherein the predetermined level is adjusted to be just above the noise level of the receiver and the control signal generating means are dimensioned to provide a control signal upon receipt of radiated signals by said receiver just exceeding the noise level of the receiver.

3. Receiver according to claim 1, wherein said control voltage generating means of said receiver is a ratio detector (8);

and said interconnecting means includes an input transistor (24) having said control voltage applied thereto, the conduction of said input transistor (24) controlling said sawtooth wave generator (10, 13) and hence the bias applied to said variable-capacity diode (4, 5), said input transistor (24) being connected across the output of said sawtooth wave generator (10, 13) and forming a current bypass upon conduction thereof; a diode (40) biased in forward direction included in said ratio detector (8) to emphasize the output thereof applied to said input transistor (24) whereby change in conduction of said input transistor (24) controlling the sawtooth wave generator (10, 13) will cause change in the bias supplied to said variable-capacity diode (4, 5) and tend to regulate the variable-capacity diode to tune the receiver to the frequency at which said ratio detector will have a maximum control voltage output and whereby said circuit will function as an automatic frequency control.

4. Receiver according to claim 1, wherein said amplifier has a radio frequency tuned circuit (6) and an oscillator circuit (7) connected thereto:

said variable-capacity diode (4, 5) includes a variable-capacity diode element in each of said radio frequency and oscillator circuits, respectively; and both of said diodes (4, 5) being connected in parallel and to said sawtooth wave generator (10, 13).

5. Receiver according to claim 1, wherein said control signal generating means includes a transistor (22) having a first voltage thereacross during scanning of said receiver and a second voltage thereacross during continued reception of a transmitted signal:

the change of voltage level between said first and second voltages forming said gain control signal; and said means delivering said gain control signal comprises a connection (9) between said transistor (22) and said amplifier, and connected to said amplifier attenuating the gain thereof during persistence of said first voltage across said transistor, while permitting full amplification, without attenuation, during persistence of said second voltage across said transistor.

6. Receiver according to claim 1, wherein said amplifier section is the IF section of the receiver.